(12) United States Patent
Hayashi et al.

(10) Patent No.: US 11,527,965 B2
(45) Date of Patent: Dec. 13, 2022

(54) POWER CONVERSION CIRCUIT AND POWER CONVERSION DEVICE

(71) Applicant: KABUSHIKI KAISHA TOSHIBA, Tokyo (JP)

(72) Inventors: Yusuke Hayashi, Yokohama Kanagawa (JP); Masahiro Koyama, Shinagawa Tokyo (JP); Kazuto Takao, Tsukuba Ibaraki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/446,941

(22) Filed: Sep. 3, 2021

(65) Prior Publication Data
US 2022/0286061 A1     Sep. 8, 2022

(30) Foreign Application Priority Data

Mar. 2, 2021 (JP) .............................. JP2021-032729

(51) Int. Cl.
*H02M 7/48* (2007.01)
*H02M 3/00* (2006.01)
(Continued)

(52) U.S. Cl.
CPC ........... *H02M 7/4815* (2021.05); *H02M 3/01* (2021.05); *H02M 3/33592* (2013.01); *H02M 1/0058* (2021.05)

(58) Field of Classification Search
CPC .. H02M 7/4815; H02M 3/01; H02M 3/33592; H02M 1/0058; H02M 7/538
See application file for complete search history.

(56) References Cited

U.S. PATENT DOCUMENTS 6,016,257 A * 1/2000 Chang ................ H05B 41/2828
363/2
6,438,004 B1   8/2002 Tanaka et al.
(Continued)

FOREIGN PATENT DOCUMENTS

JP     2003-33013 A     1/2003
JP     2004-129393 A    4/2004
(Continued)

OTHER PUBLICATIONS

Y. Hayashi, et al., "Transformerless multicellular dc-dc converter for highly efficient next generation dc distribution system," Proc. of 2017 19th European Conf. on Power Electronics and Applications (EPE'17 ECCE Europe), 9 pages (2017).

*Primary Examiner* — Yusef A Ahmed
(74) *Attorney, Agent, or Firm* — Finnegan, Henderson, Farabow, Garrett & Dunner, LLP

(57) ABSTRACT

A power conversion circuit has an inverter circuit including a first node and a second node that output a voltage according to an input voltage, a resonant circuit connected to the first node and the second node and including a third node and a fourth node that output a resonant voltage; and an output circuit connected to the third node and the fourth node and configured to output a DC voltage, wherein the resonant circuit includes a first inductor having one end connected to the third node, a first capacitor connected between the first node and another end of the first inductor, a second capacitor connectable between the second node and the fourth node, a second inductor connectable between the third node and the fourth node, and a first switch that switches whether or not to connect the second inductor between the third node and the fourth node.

12 Claims, 19 Drawing Sheets

(51) Int. Cl.
*H02M 3/335* (2006.01)
*H02M 1/00* (2006.01)

(56) References Cited

U.S. PATENT DOCUMENTS

| | | | | |
|---|---|---|---|---|
| 7,006,362 B2* | 2/2006 | Mizoguchi | ............ | H02M 3/158 |
| | | | | 363/16 |
| 7,660,133 B1* | 2/2010 | Hwang | ............ | H02M 3/33592 |
| | | | | 363/16 |
| 7,902,809 B2* | 3/2011 | Briere | ............ | H02M 3/1588 |
| | | | | 323/351 |
| 9,059,636 B2* | 6/2015 | Lehn | ............ | H02M 3/01 |
| 10,003,275 B2* | 6/2018 | Chen | ............ | H01F 27/306 |
| 10,381,917 B2* | 8/2019 | Oughton | ............ | H02M 1/15 |
| 10,581,319 B1* | 3/2020 | Lin | ............ | H02M 3/33553 |
| 10,770,979 B2* | 9/2020 | Sato | ............ | H02M 1/32 |
| 10,797,604 B1* | 10/2020 | Hung | ............ | H02M 1/32 |
| 10,819,243 B2* | 10/2020 | Iida | ............ | H02M 3/33576 |
| 2009/0303753 A1* | 12/2009 | Fu | ............ | H02M 3/01 |
| | | | | 363/20 |
| 2010/0182803 A1* | 7/2010 | Nan | ............ | H02M 3/33592 |
| | | | | 363/21.02 |
| 2011/0051468 A1* | 3/2011 | Kyono | ............ | H02M 3/285 |
| | | | | 363/21.02 |
| 2013/0099787 A1* | 4/2013 | Lu | ............ | H02M 3/3376 |
| | | | | 324/319 |
| 2013/0194831 A1* | 8/2013 | Hu | ............ | H02M 3/33569 |
| | | | | 363/21.01 |
| 2015/0118984 A1* | 4/2015 | Nagumo | ............ | H04B 1/18 |
| | | | | 455/193.1 |
| 2016/0322910 A1* | 11/2016 | Kovacevic | ............ | H02M 3/33576 |
| 2017/0054379 A1* | 2/2017 | Nishikawa | ............ | H02M 1/088 |
| 2018/0331613 A1* | 11/2018 | Kondo | ............ | H03K 17/687 |
| 2019/0157978 A1* | 5/2019 | Ni | ............ | H02M 3/285 |
| 2020/0007044 A1* | 1/2020 | Sato | ............ | H02M 1/08 |
| 2020/0169167 A1* | 5/2020 | Abramovici | ............ | H02M 3/33569 |
| 2020/0287471 A1* | 9/2020 | Huang | ............ | H02M 3/33561 |
| 2021/0408924 A1* | 12/2021 | Jin | ............ | H02M 3/01 |

FOREIGN PATENT DOCUMENTS

| | | |
|---|---|---|
| JP | 2017-139943 A | 8/2017 |
| JP | 2017-183412 A | 10/2017 |
| JP | 2019-534674 A | 11/2019 |
| JP | 6696617 B1 | 4/2020 |
| WO | WO 01/84699 A1 | 11/2001 |
| WO | WO 2018/179576 A1 | 10/2018 |

\* cited by examiner

1a: ELECTRIC FIELD COUPLING TYPE LLC RESONANT CONVERTER

1b: SERIES RESONANT CONVERTER

1b: SERIES RESONANT CONVERTER

1c: POWER CONVERSION CIRCUIT

POWER CONVERSION CIRCUIT AND POWER CONVERSION DEVICE

CROSS REFERENCE TO RELATED APPLICATIONS

This application is based upon and claims the benefit of priority from the prior Japanese Patent Application No. 2021-32729, filed on Mar. 2, 2021, the entire contents of which are incorporated herein by reference.

FIELD

An embodiment of the present invention relates to a power conversion circuit and a power conversion device.

BACKGROUND

A resonant converter using a transformer is known. The resonant converter of this type includes a resonant circuit including an excitation inductor, a leakage inductor, and a capacitor of a transformer on a primary side, and is also referred to as an LLC resonant converter.

The LLC resonant converter is currently widely used because of its good power conversion efficiency. However, the LLC resonant converter includes the transformer and causes a power loss when converting electric energy into magnetic energy. In addition, while the transformer has an advantage that a transformation ratio can be arbitrarily adjusted, there is a problem that it takes time to design the transformer.

DETAILED DESCRIPTION

According to one embodiment, a power conversion circuit comprising:

an inverter circuit that comprises a first node and a second node that output a voltage according to an input voltage;

a resonant circuit connected to the first node and the second node and that comprises a third node and a fourth node that output a resonant voltage generated by resonant operation; and an output circuit connected to the third node and the fourth node and configured to output a DC voltage according to the input voltage, wherein the resonant circuit comprises a first inductor having one end connected to the third node, a first capacitor connected between the first node and another end of the first inductor, a second capacitor connectable between the second node and the fourth node, a second inductor connectable between the third node and the fourth node, and a first switch that switches whether or not to connect the second inductor between the third node and the fourth node.

Hereinafter, embodiments of a power conversion circuit and a power conversion device will be described with reference to the drawings. Although main components of the power conversion circuit and the power conversion device will be mainly described below, the power conversion circuit and the power conversion device can have components and functions that are not illustrated or described. The following description does not exclude the components and the functions that are not illustrated or described.

Figure 1:
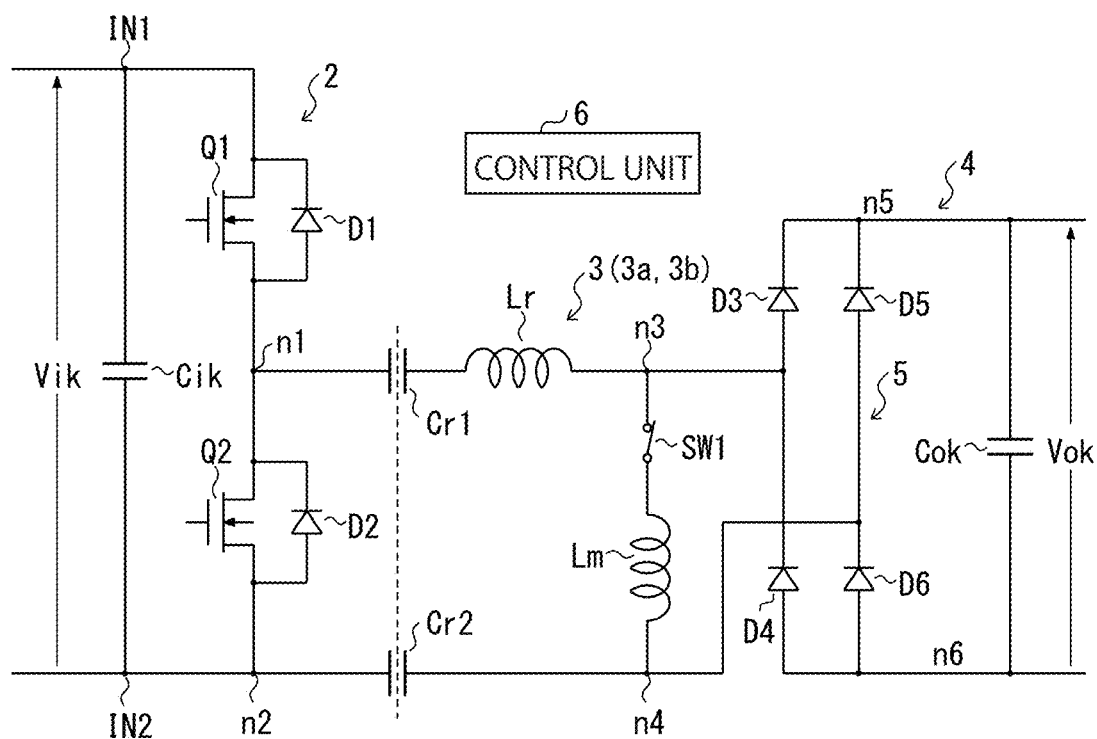
FIG. 1 is a circuit diagram of a power conversion circuit according to an embodiment.

FIG. 1 is a circuit diagram of a power conversion circuit 1 according to an embodiment. The power conversion circuit 1 in FIG. 1 is a DC-DC converter that transforms an input voltage Vik into a voltage Vok. Voltage amplitude of the input voltage Vik is not limited. In addition, the input voltage Vik may have a rectified waveform including a voltage ripple in a DC voltage. For example, the input voltage Vik may have a waveform obtained by half-wave or full-wave rectifying a commercial AC voltage of 100 V or 200 V.

The power conversion circuit 1 of FIG. 1 performs power conversion without using a transformer. By omitting the transformer, it is possible to reduce a power loss when electric energy is converted into magnetic energy.

The power conversion circuit 1 of FIG. 1 includes an inverter circuit 2, a resonant circuit 3, and an output circuit 4. Although the inverter circuit 2 of FIG. 1 illustrates an example of a half-bridge circuit, it may be configured by a full-bridge circuit. The inverter circuit 2 of FIG. 1 includes a first transistor Q1 and a second transistor Q2 cascode-connected between a first input node IN1 and a second input node IN2 to which the input voltage Vik is applied. The first transistor Q1 and the second transistor Q2 are, for example, N-type power MOSFETs. A diode D1 is connected between a drain and a source of the first transistor Q1, and a diode D2 is connected between a drain and a source of the second transistor Q2. These diodes D1 and D2 may be integrally formed with the first transistor Q1 and the second transistor Q2. Further, a capacitor Cik is connected between the first input node IN1 and the second input node IN2. Output nodes (hereinafter referred to as a first node n1 and a second node n2) of the inverter circuit 2 are connected to the drain and the source of the second transistor Q2.

The resonant circuit 3 is connected between the first node n1 and the second node n2. The resonant circuit 3 has a third node n3 and a fourth node n4. The third node n3 and the fourth node n4 output a resonant voltage generated by resonant operation. In addition, the resonant circuit 3 includes a first inductor Lr, a first capacitor Cr1, a second capacitor Cr2, a second inductor Lm, and a first switch SW1.

One end of the first inductor Lr is connected to the third node n3, The first capacitor Cr1 is connected between the first node n1 and another end of the first inductor Lr. The second capacitor Cr2 is connected between the second node n2 and the fourth node n4. The second inductor Lm is connected between the third node n3 and the fourth node n4. The first switch SW1 switches whether or not to connect the second inductor Lm between the third node n3 and the fourth node n4. The first switch SW1 can be configured with a mechanical switch or a semiconductor element such as a MOS transistor.

The resonant circuit 3 switches the resonant operation by switching control of the first switch SW1. When the first switch SW1 is in a first switching state, that is, when the first switch SW1 is turned on, the resonant circuit 3 generates a first resonant circuit 3a that causes a resonant current to flow through the first capacitor Cr1, the first inductor Lr, the second inductor Lm, the second capacitor Cr2, and the output circuit 4. Further, when the first switch SW1 is in a second switching state, that is, when the first switch SW1 is turned off, the resonant circuit 3 generates a second resonant circuit 3b that causes the resonant current to flow through the first capacitor Cr1, the first inductor Lr, the output circuit 4, and the second capacitor Cr2. The resonant voltage generated by the first resonant circuit 3a or the second resonant circuit 3b is supplied to the third node n3 and the fourth node n4.

The output circuit 4 of FIG. 1 is connected to the third node n3 and the fourth node n4. The output circuit 4 outputs the voltage Vok corresponding to the input voltage Vik. An internal configuration of the output circuit 4 is arbitrary, and various configurations can be adopted. For example, the output circuit 4 of FIG. 1 includes a full-bridge circuit 5 including four diodes D3 to D6 and a capacitor Cok, and outputs the voltage Vok corresponding to the input voltage Vik. Note that the voltage Vok in the present specification is not limited to a DC voltage having a constant voltage level, and may be a voltage having a voltage level that is higher than a reference level and periodically changes, or a voltage having a voltage level that is lower than the reference level and periodically changes.

The first capacitor Cr1 and the second capacitor Cr2 act to electrically insulate the inverter circuit 2 from the output circuit 4 as indicated by a broken line in FIG. 1. As described above, the power conversion circuit 1 of FIG. 1 can constitute an electric field coupling type converter that electrically insulates the inverter circuit 2 from the output circuit 4 by the first capacitor Cr1 and the second capacitor Cr2, instead of the transformer.

In addition, the power conversion circuit 1 of FIG. 1 includes a control unit 6. The control unit 6 performs switching control of the first switch SW1 based on output power or an output current of the output circuit 4. Furthermore, the control unit 6 not only performs switching control of the first switch SW1 but also performs on/off control of the first transistor Q1 and the second transistor Q2 in the inverter circuit 2 of FIG. 1. Alternatively, the on/off control of the first transistor Q1 and the second transistor Q2 and the switching control of the first switch SW1 may be performed by different control units 6.

The control unit 6 performs switching control of the first switch SW1 such that the second resonant circuit 3b is generated within a range in which the output power or the output current of the output circuit 4 is greater than or equal to a first reference value and less than a second reference value that is larger than the first reference value, and performs switching control of the first switch SW1 such that the first resonant circuit 3a is generated within a range in which the output power or the output current thereof is less than the first reference value or greater than or equal to the second reference value.

Thus, in the power conversion circuit 1 of FIG. 1, the first switch SW1 switches whether or not to connect the second inductor Lm between the third node n3 and the fourth node n4, Then, when the second inductor Lm is connected between the third node n3 and the fourth node n4, resonance is performed by the first resonant circuit 3a described above. Further, when the second inductor Lm is not connected between the third node n3 and the fourth node n4, the resonance is performed by the second resonant circuit 3b described above.

Figure 2:
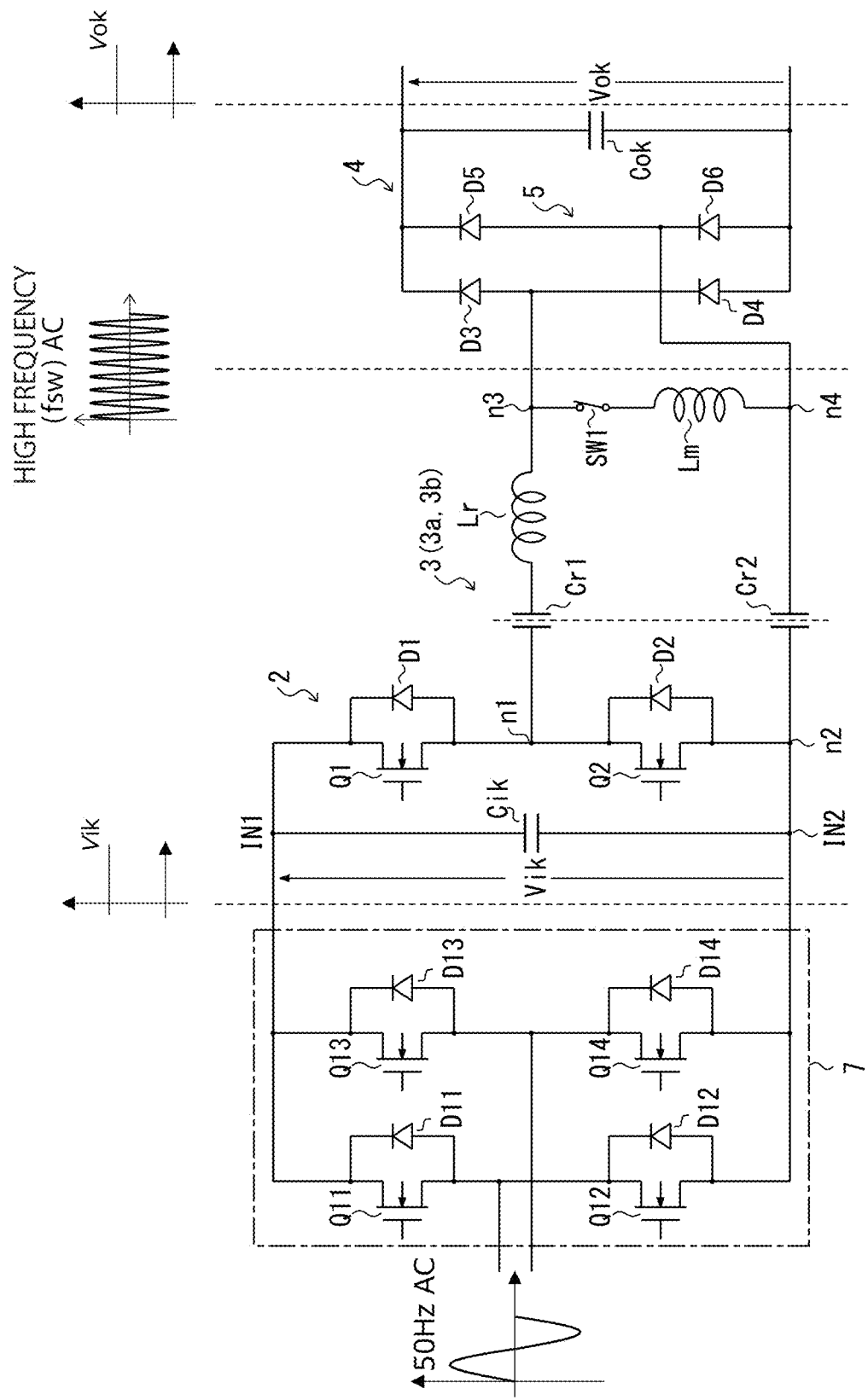
FIG. 2 is a circuit diagram in which an AC-DC converter is added to a preceding stage of the power conversion circuit of FIG. 1.

A rectifier circuit or an AC-DC converter is connected to a preceding stage of the inverter circuit 2 of FIG. 1. FIG. 2 is a circuit diagram in which an AC-DC converter 7 is added to a preceding stage of the power conversion circuit 1 of FIG. 1. FIG. 2 illustrates an example of a waveform of an input voltage of the AC-DC converter 7, a waveform of an output voltage of the AC-DC converter 7, that is, an input voltage of the inverter circuit 2, a waveform of an output voltage of the resonant circuit 3, and a waveform of an output voltage of the output circuit 4.

As illustrated in FIG. 2, the input voltage of the AC-DC converter 7 is, for example, an AC voltage of commercial power (50 Hz). The output voltage of the AC-DC converter 7 is, for example, a DC voltage. The output voltage of the resonant circuit 3 is an AC voltage having a frequency higher than that of the input voltage of the AC-DC converter 7. The output voltage of the output circuit 4 is, for example, a DC voltage. The AC-DC converter 7 includes switching elements Q11 and Q12 connected in series between the input nodes IN1 and IN2, switching elements Q13 and Q14 connected in parallel to the switching elements Q11 and Q12, and diodes D11 to D14 connected between drains and sources of these switching elements. The input voltage is input between the switching elements Q11 and Q12 and between the switching elements Q13 and Q14.

Figure 3:
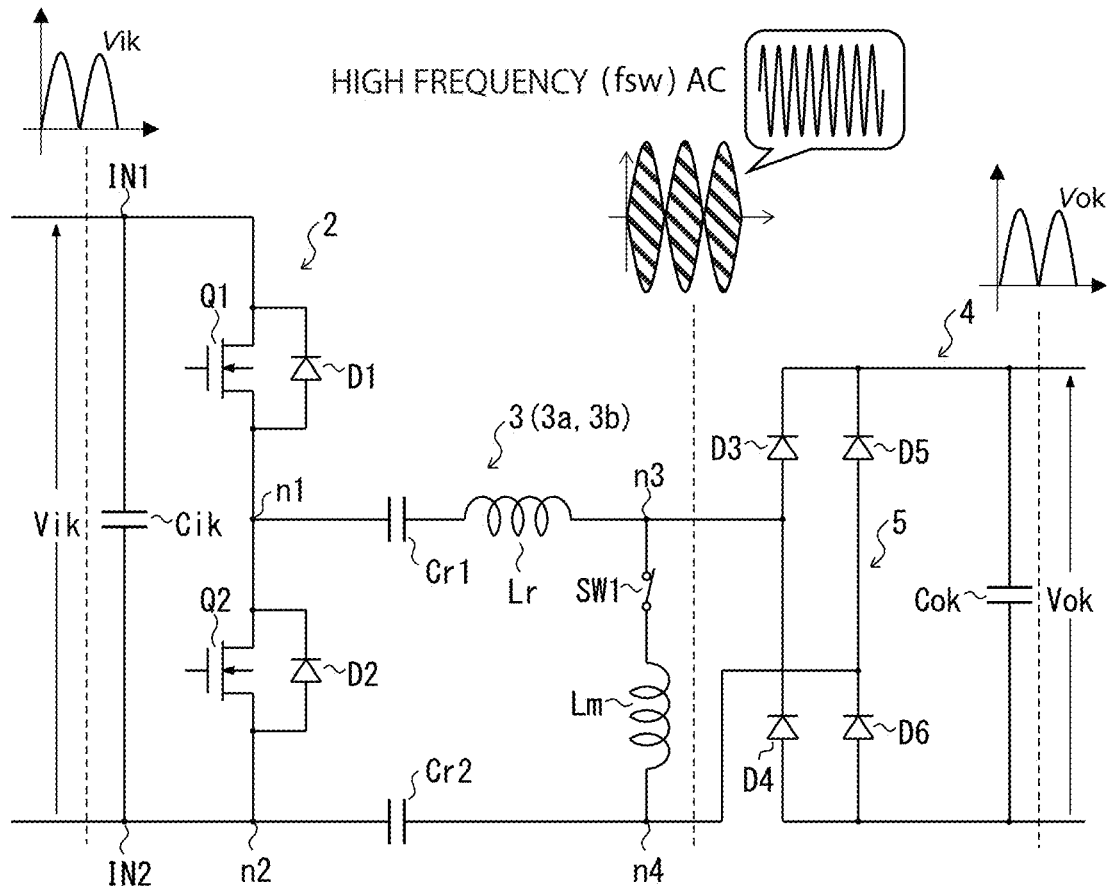
FIG. 3 is a diagram illustrating a waveform when a voltage of a full-wave rectified waveform is applied to the power conversion circuit of FIG. 1.

Although FIG. 2 illustrates an example in which the DC voltage from the AC-DC converter 7 is input to the inverter circuit 2 in the power conversion circuit 1 of FIG. 1, as illustrated in FIG. 3, a voltage full-wave rectified by a rectifier circuit (not illustrated) may be input. In this case, the output voltage of the resonant circuit 3 has a resonant waveform as illustrated in FIG. 3. In addition, the output voltage of the output circuit has a full-wave rectified waveform as illustrated in FIG. 3.

Figure 4:
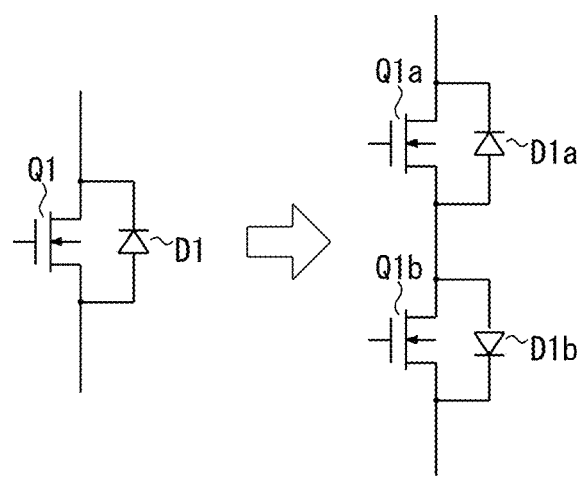
FIG. 4 is a diagram illustrating an example in which a transistor in an inverter circuit is configured by a bidirectional switching element.

As described above, the input voltage of the inverter circuit 2 in the power conversion circuit 1 of FIG. 1 has basically not an AC voltage waveform, but a DC voltage waveform or a full-wave rectified voltage waveform. It does not have an AC voltage waveform that swings to a negative side of a reference voltage. However, in a case where each of the first transistor Q1 and the second transistor Q2 in the inverter circuit 2 of FIG. 1 includes bidirectional switching elements Q1$a$ and Q1$b$ as illustrated in FIG. 4, an AC voltage can be input to the inverter circuit 2. Therefore, the power conversion circuit 1 of FIG. 1 is basically the DC-DC converter, and is the AC-DC converter when the bidirectional switching element is used in the inverter circuit 2.

Figure 5A:
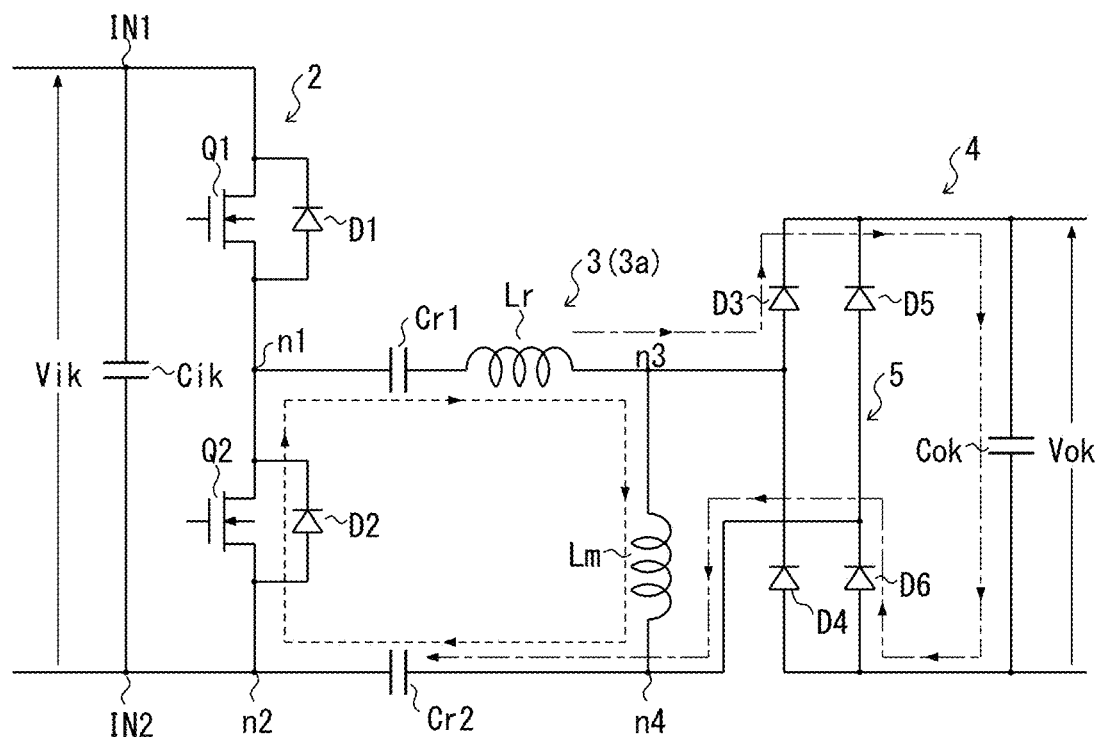
FIG. 5A is a diagram illustrating a current direction of an electric field coupling type LLC resonant converter.
Figure 5B:
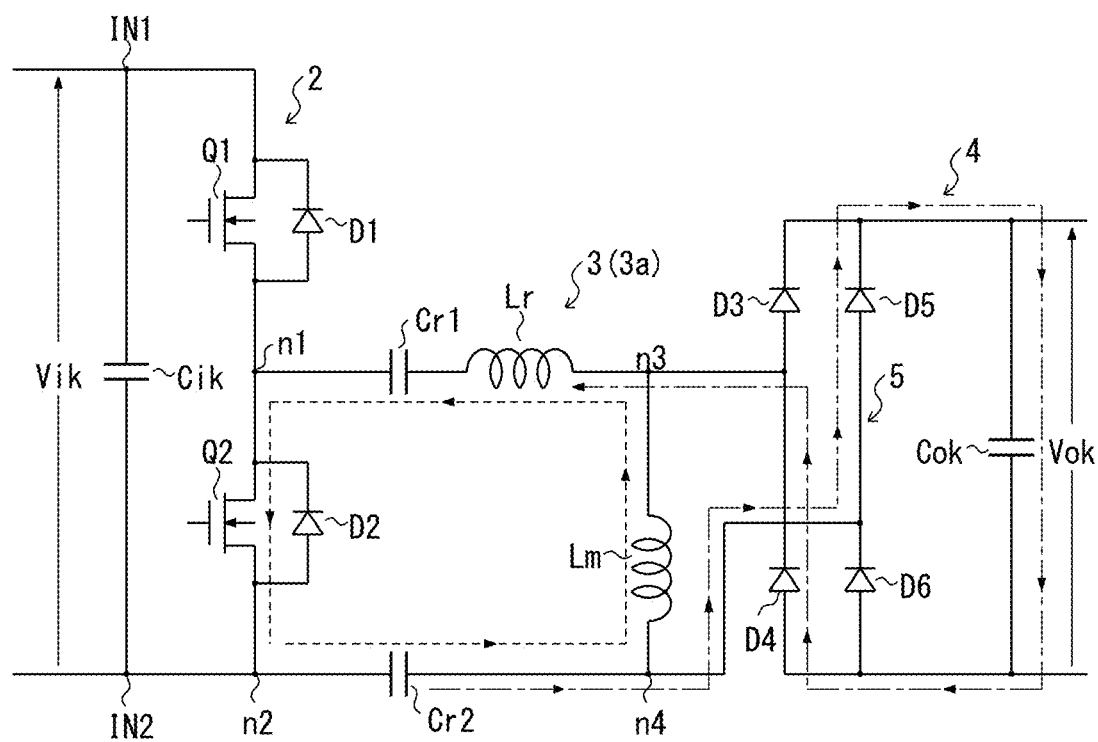
FIG. 5B is a diagram illustrating a current direction of the electric field coupling type LLC resonant converter.

FIGS. 5A and 5B are circuit diagrams in a case where the first switch SW1 is turned on and the second inductor Lm is connected between the third node n3 and the fourth node n4. FIG. 5A illustrates a current path in a case where a current flowing through the first inductor Lr is in a positive direction (direction from the node n1 to the node n3), and FIG. 5B illustrates a current path in a case where the current flowing through the first inductor Lr is in a negative direction. A broken line in FIGS. 5A and 5B indicates a current path flowing in the first resonant circuit 3$a$, and an alternate long and short dash line therein indicates a current path flowing from the resonant circuit 3 to the output circuit 4. In the present specification, the circuit in FIGS. 5A and 5B is referred to as an electric field coupling type LLC resonant converter 1$a$.

Figure 6A:
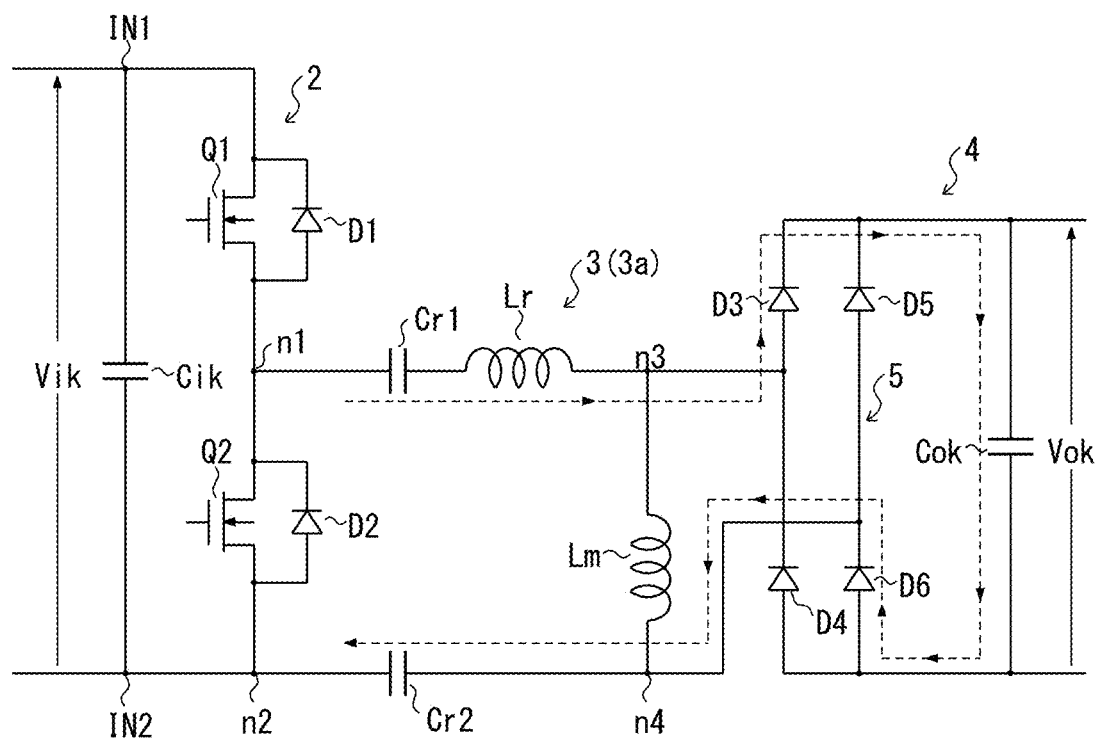
FIG. 6A is a diagram illustrating a current direction of a series resonant converter.
Figure 6B:
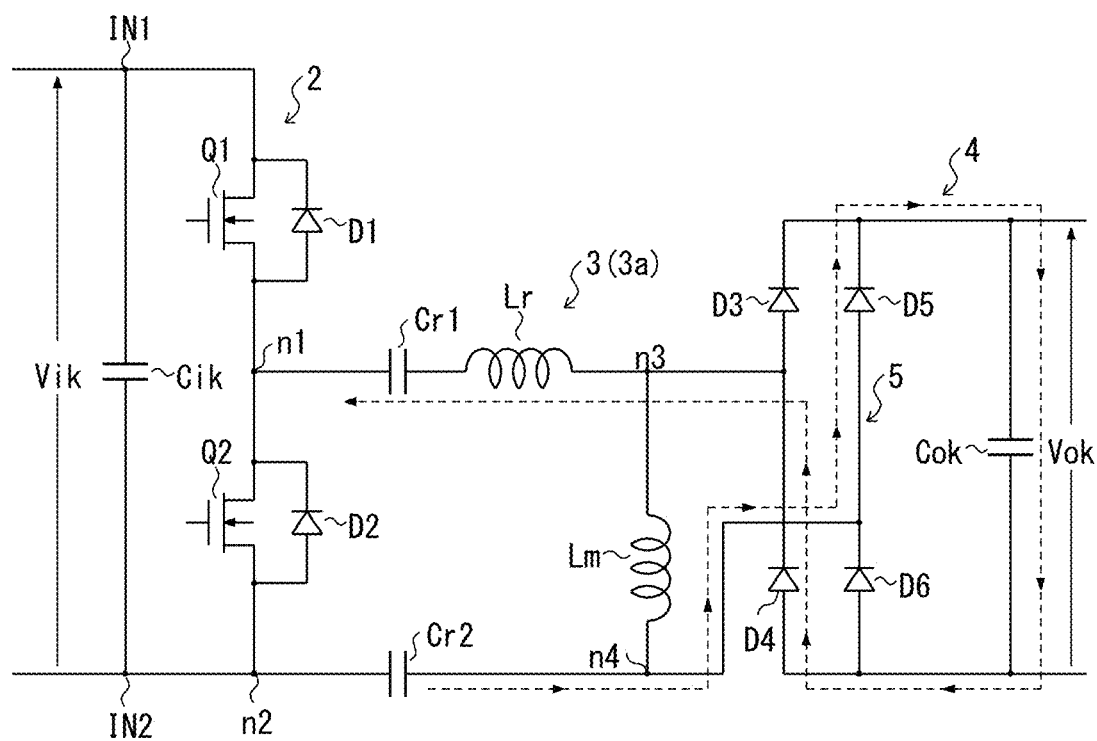
FIG. 6B is a diagram illustrating a current direction of the series resonant converter.

FIGS. 6A and 6B are circuit diagrams in a case where the first switch SW1 is turned off and the second inductor Lm is not connected between the third node n3 and the fourth node n4. FIG. 6A illustrates a current path in a case where a current flowing through the first inductor Lr is in a positive direction by a broken line, and FIG. 5B illustrates a current path in a case where the current flowing through the first inductor Lr is in a negative direction by a broken line. In the present specification, the circuit in FIGS. 6A and 6B is referred to as a series resonant converter 1$b$.

When the first switch SW1 is turned on, as illustrated in FIGS. 5A and 5B, the current flows from the first inductor Lr to the output circuit 4 through a path different from that of the first resonant circuit 3$a$, On the other hand, when the first switch SW1 is turned off, as illustrated in FIGS. 6A and 6B, the current flowing through second resonant circuit 3$b$ also flows through the output circuit 4.

As described above, in the first resonant circuit 3$a$ in FIGS. 5A and 5B and the second resonant circuit 3$b$ in FIGS. 6A and 6B, the current flows in different places, but the direction of the current in the output circuit 4 is common, and the DC voltage Vok having the same voltage level can be generated.

As can be seen from FIGS. 5A, 5B, 6A, and 6B, the power conversion circuit 1 according to the present embodiment supplies a voltage between the drain and the source of the transistor Q2 on a low side in the inverter circuit 2 having the half-bridge configuration to the resonant circuit 3. Therefore, a transformation ratio of the voltage Vok output from the output circuit 4 to the input voltage Vik becomes 2:1, and this transformation ratio cannot be changed. In an LLC resonant converter using a transformer, there is an advantage that a transformation ratio can be changed by changing a winding ratio of the transformer. However, the transformer has a loss due to conversion of electric energy into magnetic energy in addition to difficulty in design. The power conversion circuit 1 according to the present embodiment can improve power conversion efficiency.

Figure 7:
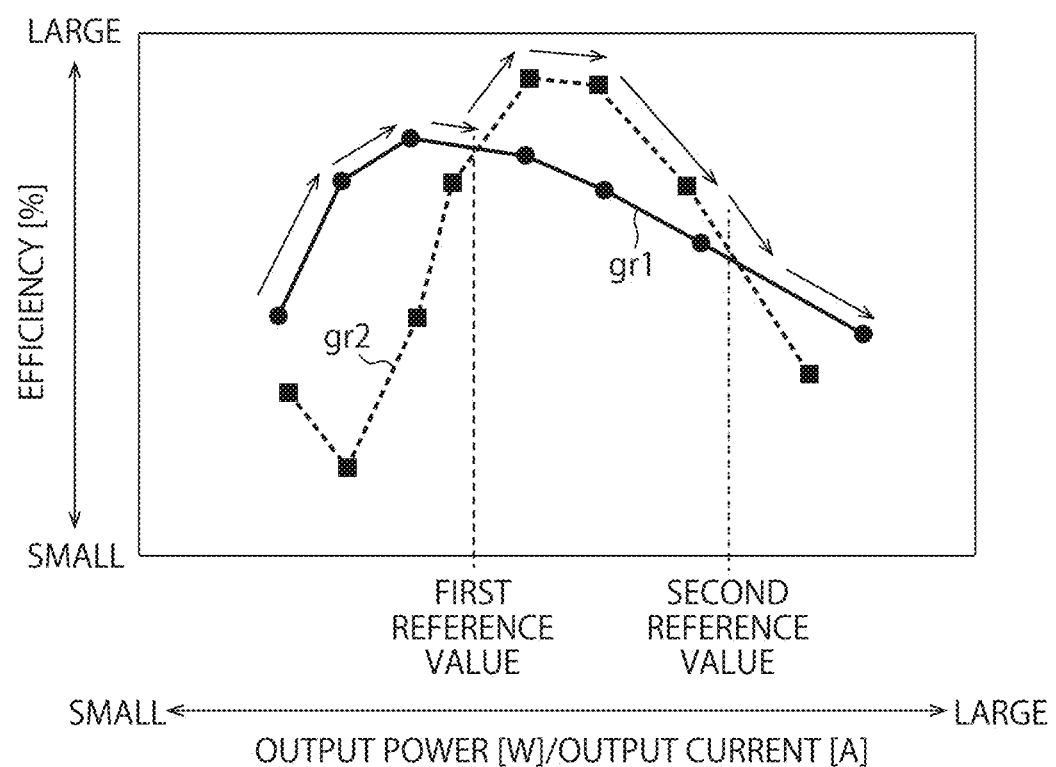
FIG. 7 is a graph illustrating a relationship between output power or an output current and power conversion efficiency of the electric field coupling type LLC resonant converter of FIGS. 5A and 5B and the series resonant converter of FIGS. 6A and 6B.

FIG. 7 is a graph illustrating a relationship between output power or an output current and power conversion efficiency of the electric field coupling type LLC resonant converter 1$a$ of FIGS. 5A and 5B and the series resonant converter 1$b$ of FIGS. 6A and 6B. In FIG. 7, a horizontal axis represents the output power (output current) of the output circuit 4, and a vertical axis represents the power conversion efficiency. A graph gr1 of FIG. 7 illustrates a characteristic of the electric field coupling type LLC resonant converter 1$a$, and a graph gr2 illustrates a characteristic of the series resonant converter 1$b$.

As can be seen from FIG. 7, depending on a value of the output power (output current) of the output circuit 4, there is a case where the electric field coupling type LLC resonant converter is of FIGS. 5A and 5B has higher power conversion efficiency than the series resonant converter 1$b$ of FIGS. 6A and 6B, and conversely, a case where the series resonant converter 1$b$ of FIGS. 6A and 6B has higher power conversion efficiency than the electric field coupling type LLC resonant converter 1$a$ of FIGS. 5A and 5B. For example, in FIG. 7, the series resonant converter 1$b$ of FIGS. 6A and 6B has higher power conversion efficiency than the electric field coupling type LLC resonant converter is of FIGS. 5A and 5B when the output power (output current) is between the first reference value and the second reference value, and the electric field coupling type LLC resonant converter 1$a$ of FIGS. 5A and 5B has higher power conversion efficiency than the series resonant converter 1$b$ of FIGS. 6A and 6B when the output power (output current) is other than that.

Therefore, the control unit 6 turns off the first switch SW1 and performs the resonant operation in the series resonant converter 1$b$ of FIGS. 6A and 6B within a range where the output current is greater than or equal to the first reference value and is less than the second reference value larger than the first reference value, and turns on the first switch SW1 and performs the resonant operation in the electric field coupling type LLC resonant converter 1$a$ of FIGS. 5A and 5B within a range where the output current is less than the first reference value or is greater than or equal to the second reference value.

Figure 8:
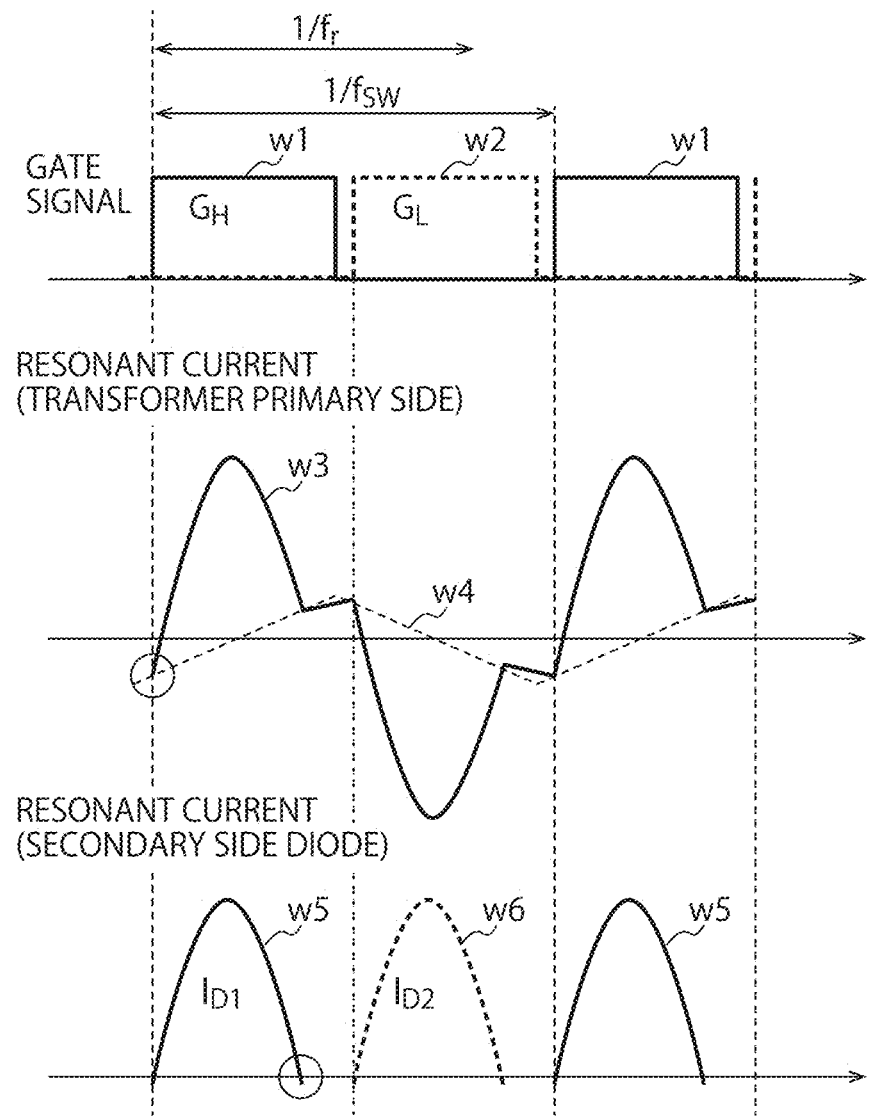
FIG. 8 is an operation timing chart of the power conversion circuit of FIG. 1.

FIG. 8 is an operation timing chart of the power conversion circuit 1 of FIG. 1. FIG. 8 illustrates an operation timing when the first switch SW1 is turned on to operate as the electric field coupling type LLC resonant converter 1$a$ of FIGS. 5A and 5B. FIG. 8 illustrates gate voltage waveforms w1 and w2 of the first transistor Q1 and the second transistor Q2 in the inverter circuit 2, a resonant current waveform w3 in the first resonant circuit 3$a$, a current waveform w4 flowing through the second inductor Lm, and current waveforms w5 and w6 flowing through the output circuit 4.

The first transistor Q1 on a high side in the inverter circuit 2 is turned on from time t1 to t2, and the second transistor Q2 on a low side is turned on from time t2 to t3. Time t1 to t3 is one cycle corresponding to a switching frequency. The resonant current w3 in the first resonant circuit 3$a$ flows in opposite directions between the time t1 to t2 and the time t2 to t3. Since the output circuit 4 includes the full-bridge circuit, the directions of the flowing currents w5 and w6 become the same between the time t1 to t2 and the time t2 to t3.

Figure 9:
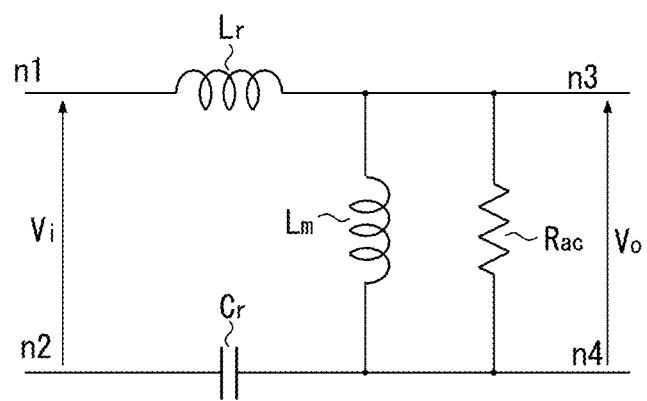
FIG. 9 is an equivalent circuit diagram of the power conversion circuit of FIG. 1.

FIG. 9 is an equivalent circuit diagram of the power conversion circuit 1 of FIG. 1. An equivalent circuit of FIG. 9 includes the first inductor Lr, the second inductor Lm, and a capacitor Cr connected in series between the first node n1 and the second node n2, and a resistor connected between the third node n3 and the fourth node n4. The capacitor Cr corresponds to combined capacitance of the first capacitor Cr1 and the second capacitor Cr2 in FIG. 1. In FIG. 9, an input voltage Vi is input between the first node n1 and the second node n2, and an output voltage Vo is output between the third node n3 and the fourth node n4.

A ratio (transformation ratio) between the input voltage Vi and the output voltage Vo is expressed by the following formula (1).

$$\left|\frac{V_o}{V_i}\right| = M = \frac{1}{\sqrt{\left(1+\lambda+\frac{\lambda}{f_n^2}\right)^2 + Q^2\left(f_n - \frac{1}{f_n}\right)^2}} \quad (1)$$

$$\lambda = \frac{L_r}{L_m}, f_n = \frac{f_{sw}}{f_r}, f_r = \frac{1}{2\pi\sqrt{L_r C_r}},$$

$$Z_o = \sqrt{\frac{L_r}{C_r}}, Q = \frac{Z_o}{R_{ac}}, R_{ac} = \frac{8}{\pi^2} R_{out}$$

In the formula (Zo is a characteristic impedance, Q is a quality factor, Rac is AC equivalent resistance, and Rout is load resistance.

As can be seen from the formula (1), for example, a voltage conversion ratio |Vo/Vi| can be changed by changing capacitance of the capacitor Cr (combination of the first capacitor Cr1 and the second capacitor Cr2). The voltage conversion ratio also changes depending on a switching frequency fsw.

Figure 10A:
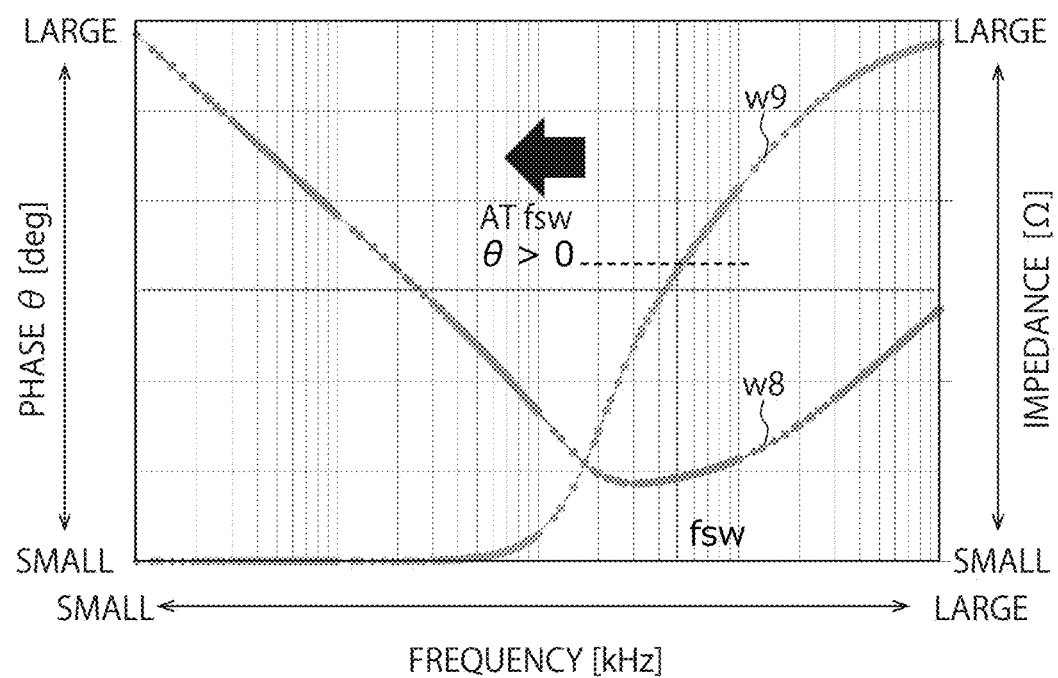
FIG. 10A is a graph illustrating an impedance characteristic and a phase characteristic of the electric field coupling type LLC resonant converter of FIGS. 5A and 5B.
Figure 10B:
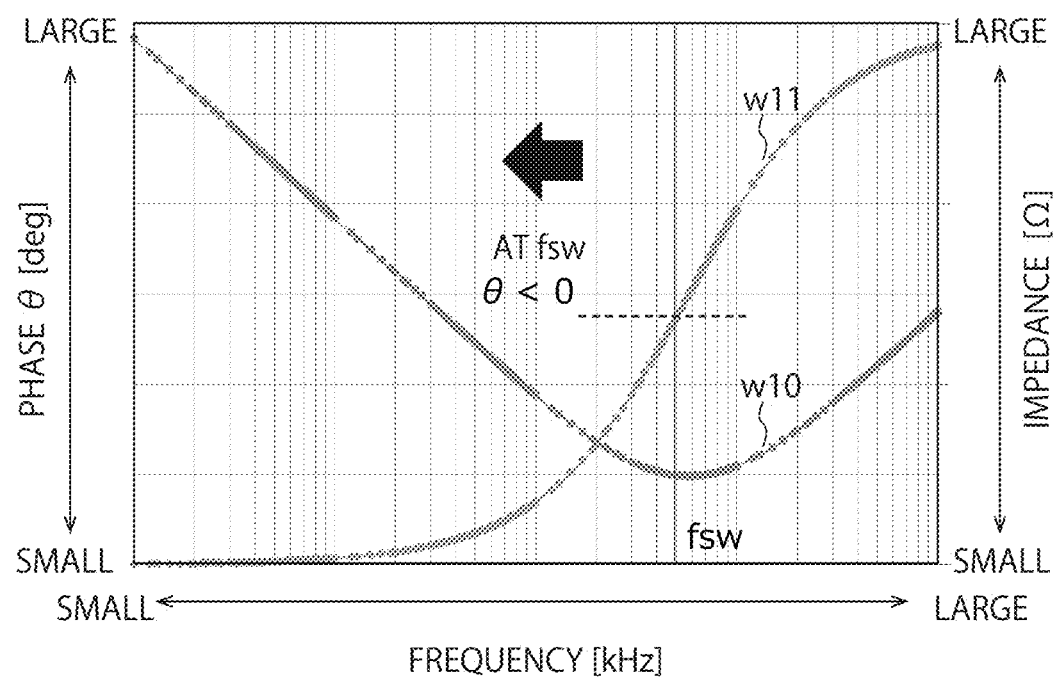
FIG. 10B is a graph illustrating impedance and phase characteristics of the series resonant converter of FIGS. 6A and 6B.

FIG. 10A is a graph illustrating an impedance characteristic and a phase characteristic of the electric field coupling type LLC resonant converter 1a of FIGS. 5A and 5B, and FIG. 10B is a graph illustrating an impedance characteristic and a phase characteristic of the series resonant converter 1b of FIGS. 6A and 6B. In FIGS. 10A and 10B, a horizontal axis represents a frequency [kHz], and a vertical axis represents an impedance [Q (ohm)], a phase [deg].

A waveform w8 in FIG. 10A and a waveform w10 in FIG. 10B represent the impedance characteristics, and a waveform w9 in FIG. 10A and a waveform w11 in FIG. 10B represent the phase characteristics. In order to normally perform soft switching, it is desirable that the switching frequency fsw be slightly lower than a resonant frequency, and a phase delay occurs at the switching frequency fsw. Note that the phase delay means that a phase of a current is delayed with respect to a phase of a voltage, and means that the phase takes a positive value in FIGS. 10A, 10B, and 10C. In the electric field coupling type LLC resonant converter 1a of FIGS. 5A and 5B, as illustrated in FIG. 10A, a phase characteristic at the switching frequency fsw is larger than 0, and a phase delay occurs. Therefore, the soft switching can be normally performed. On the other hand, in the series resonant converter 1b of FIGS. 6A and 6B, as illustrated in FIG. 10B, a phase advance occurs at the switching frequency fsw. Therefore, there is a possibility that the soft switching cannot be normally performed as it is. Therefore, it is conceivable to adjust the capacitance of the second capacitor Cr2 in the series resonant converter 1b of FIGS. 6A and 6B to set the phase characteristic at the switching frequency fsw to 0 or more.

Figure 10C:
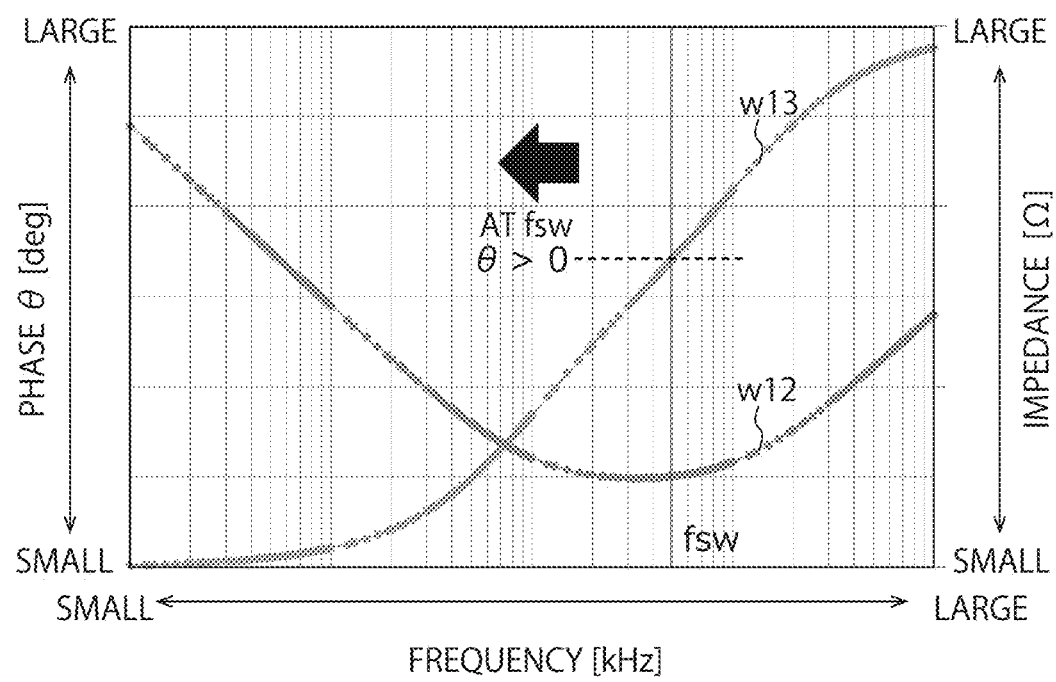
FIG. 10C is a graph illustrating impedance and phase characteristics when a value of a second capacitor of the series resonant converter of FIGS. 6A and 6B is changed (increased)
Figure 11:
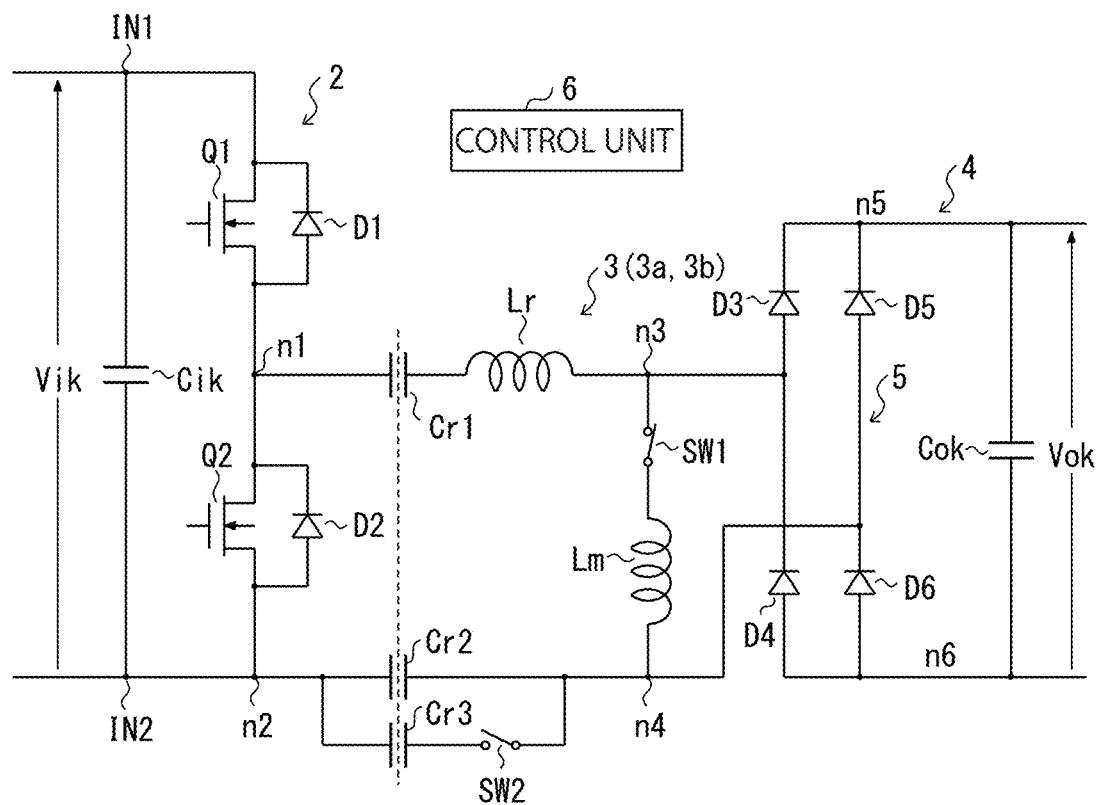
FIG. 11 is a circuit diagram according to a modification of the power conversion circuit of FIG. 1.

As described above, an optimum capacitance value of the second capacitor Cr2 for performing the soft switching is different between a case where the power conversion circuit 1 of FIG. 1 is operated as the electric field coupling type LLC resonant converter is of FIGS. 5A and 5B and a case where the power conversion circuit is operated as the series resonant converter 1b of FIGS. 6A and 6B. Therefore, in addition to the first switch SW1, a second switch SW2 that changes the capacitance value of the second capacitor Cr2 may be provided as illustrated in FIG. 11 to be described later. FIG. 10C is a graph illustrating impedance and phase characteristics when the capacitance value of the second capacitor Cr2 of the series resonant converter 1b of FIGS. 6A and 6B is changed. A waveform w12 in FIG. 10C represents an impedance characteristic, and a waveform w13 represents a phase characteristic. As can be seen by comparing FIGS. 10B and 10C, by changing the capacitance value of the second capacitor Cr2, the phase characteristic and the impedance characteristic in a case of operating as the series resonant converter 1b of FIGS. 6A and 6B can be adjusted.

FIG. 11 is a circuit diagram according to a modification of the power conversion circuit 1 of FIG. 1. In FIG. 11, components that are common to those in FIG. 1 are denoted by common signs, and differences are mainly described below. A power conversion circuit 1c of FIG. 11 includes a third capacitor Cr3 and a second switch SW2 in addition to the configuration of the power conversion circuit 1 of FIG. 1. The third capacitor Cr3 is connected between the second node n2 and the fourth node n4.

The second switch SW2 selectively selects whether or not to add the third capacitor Cr3 to the second capacitor Cr2, and is connected between the second node n2 and the fourth node n4. The second switch SW2 performs switching control in conjunction with the first switch SW1. When the first switch SW1 is turned on to operate the power conversion circuit 1c of FIG. 11 as the electric field coupling type LLC resonant converter 1a of FIGS. 5A and 5B, the second switch SW2 selects the second capacitor Cr2. Further, when first switch SW1 is turned off to operate the power conversion circuit 1c in FIG. 11 as the series resonant converter 1b in FIGS. 6A and 6B, the second switch SW2 selects addition of the third capacitor Cr3 to the second capacitor Cr2.

Capacitance values of the second capacitor Cr2 and the third capacitor Cr3 are set to values at which the soft switching can be normally performed. In other words, the capacitance values are set such that a phase delay occurs at the switching frequency.

The control unit 6 performs switching control of the first switch SW1 and the second switch SW2 in conjunction with each other based on output power or an output current of the output circuit 4. When the second inductor Lm is connected between the third node n3 and the fourth node n4 in the first switch SW1, the control unit 6 does not select the third capacitor Cr3 in the second switch SW2, and connects only the second capacitor Cr2 between the second node n2 and the fourth node n4. Further, when the second inductor Lm is not connected between the third node n3 and the fourth node n4 in the first switch SW1, the control unit 6 selects the third capacitor Cr3 in the second switch SW2, and connects it between the second node n2 and the fourth node n4 in parallel with the second capacitor Cr2.

When the first switch SW1 is in a first switching state (ON) and the second switch SW2 is in a second switching state (OFF), the resonant circuit 3 generates the first resonant circuit 3a that causes a resonant current to flow through the first capacitor Cr1, the first inductor Lr, the second inductor Lm, the second capacitor Cr2, and the output circuit 4. Further, when the first switch SW1 is in the second switching state (OFF) and the second switch SW2 is in the first switching state (ON), the resonant circuit 3 generates the second resonant circuit 3b that causes the resonant current to flow through the first capacitor Cr1, the first inductor Lr, the output circuit 4, the second capacitor Cr2, and the third capacitor Cr3. Capacitance of the third capacitor Cr3 may be the same as or different from the capacitance of the second capacitor Cr2.

Figure 12:
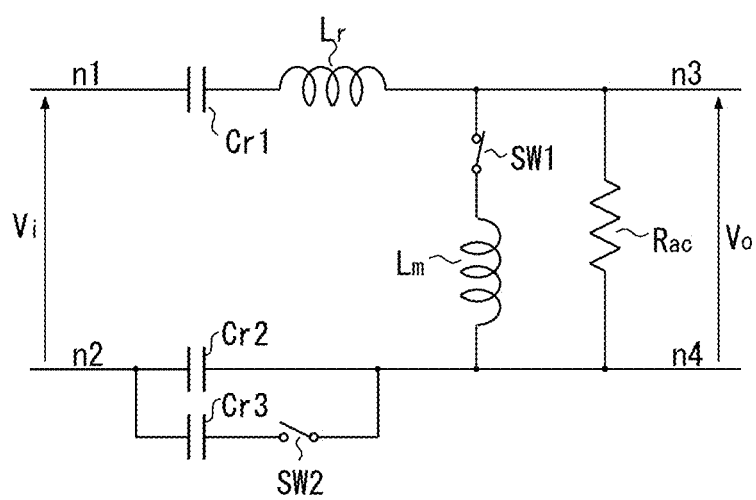
FIG. 12 is an equivalent circuit diagram in which capacitors, a first switch, and a second switch of FIG. 11 are added to FIG. 9.

FIG. 12 is an equivalent circuit diagram in which the capacitors Cr1, Cr2, and Cr3, the first switch SW1, and the second switch SW2 of FIG. 11 are added to FIG. 9. Combined capacitance Cr of the capacitors Cr1, Cr2, and Cr3 affects a resonant frequency fr. The combined capacitance Cr in a case where the first switch SW1 is turned on and the second switch SW2 is turned off in FIG. 12 is expressed by the following formula (2).

$$C_r = \left(\frac{1}{C_{r1}} + \frac{1}{C_{r2}}\right)^{-1} \quad (2)$$

The combined capacitance Cr in a case where both the first switch SW1 and the second switch SW2 are turned off in FIG. 12 is also expressed by the above-described formula (2). On the other hand, the combined capacitance Cr in a case where the first switch SW1 is turned off and the second switch SW2 is turned on in FIG. 12 is expressed by the following formula (3).

$$C_r = \left(\frac{1}{C_{r1}} + \frac{1}{C_{r2} + C_{r3}}\right)^{-1} \quad (3)$$

As described above, since the combined capacitance Cr of the power conversion circuit 1c can be changed by turning on the second switch SW2, the resonant frequency fr can be changed, and a condition of the soft switching can also be changed.

Since the power conversion circuit 1 or 1c in FIG. 1 or 11 does not include a transformer, voltage amplitude of the output voltage cannot be adjusted by adjusting a transformation ratio. However, the amplitude of the output voltage can be arbitrarily adjusted by setting the power conversion circuit 1 or is to an ISOP (Input-Series Output-Parallel) or an IPOS (Input-Parallel Output-Series).

A power conversion circuit having an ISOP configuration is configured by providing the plurality of circuits 1 or is of FIG. 1 or 11, connecting the input nodes IN1 and IN2 of the inverter circuit 2 in each circuit 1 or 1c in series, and connecting output nodes n5 and n6 of the output circuit 4 in each circuit 1 or is in parallel. A power conversion circuit having an IPOS configuration is configured by providing the plurality of circuits 1 or is of FIG. 1 or 11, connecting the input nodes IN1 and IN2 of the inverter circuit 2 in each circuit 1 or is in parallel, and connecting the output nodes n5 and n6 of the output circuit 4 in each circuit 1 or is in series.

Figure 13A:
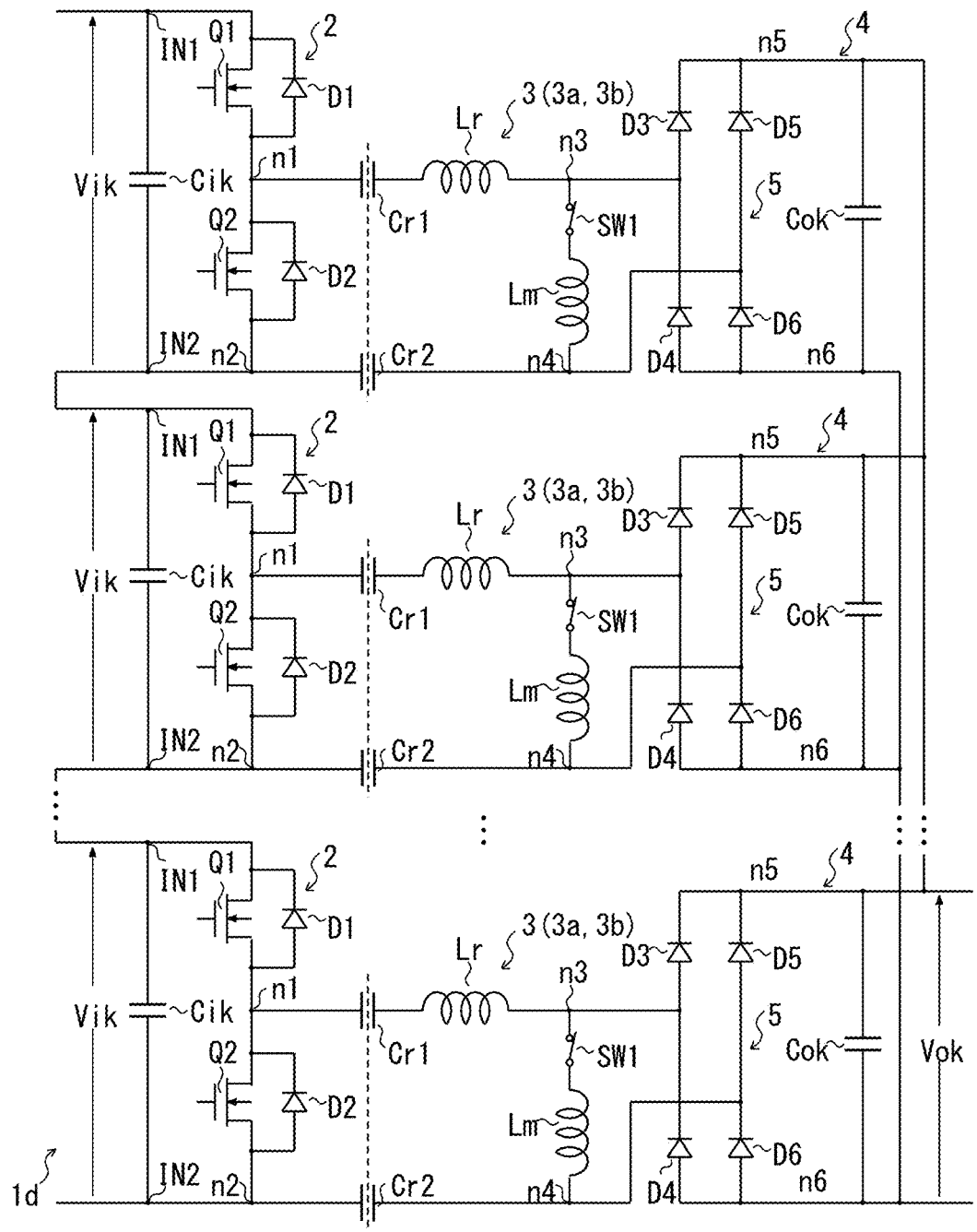
FIG. 13A is a block diagram illustrating an example of an output circuit having an ISOP configuration.

FIG. 13A is a block diagram illustrating an example of a power conversion circuit 1d having an ISOP configuration. The power conversion circuit 1d of FIG. 13A includes the plurality of power conversion circuits 1 of FIG. 1, and connects the input nodes IN1 and IN2 of the inverter circuit 2 in each power conversion circuit 1 in series. As a result, an input voltage having large voltage amplitude can be input to the power conversion circuit 1 of FIG. 1. Further, in FIG. 13A, the output nodes n5 and n6 of the output circuit 4 in each power conversion circuit 1 are connected in parallel. As a result, the power conversion circuit 1d in FIG. 13A can output a voltage obtained by greatly converting the voltage amplitude between the input and the output. Therefore, by arbitrarily adjusting the number of connections of the power conversion circuit 1 in the power conversion circuit 1d, it is possible to realize a DC-DC converter adapted to an input voltage having arbitrary voltage amplitude.

Figure 13B:
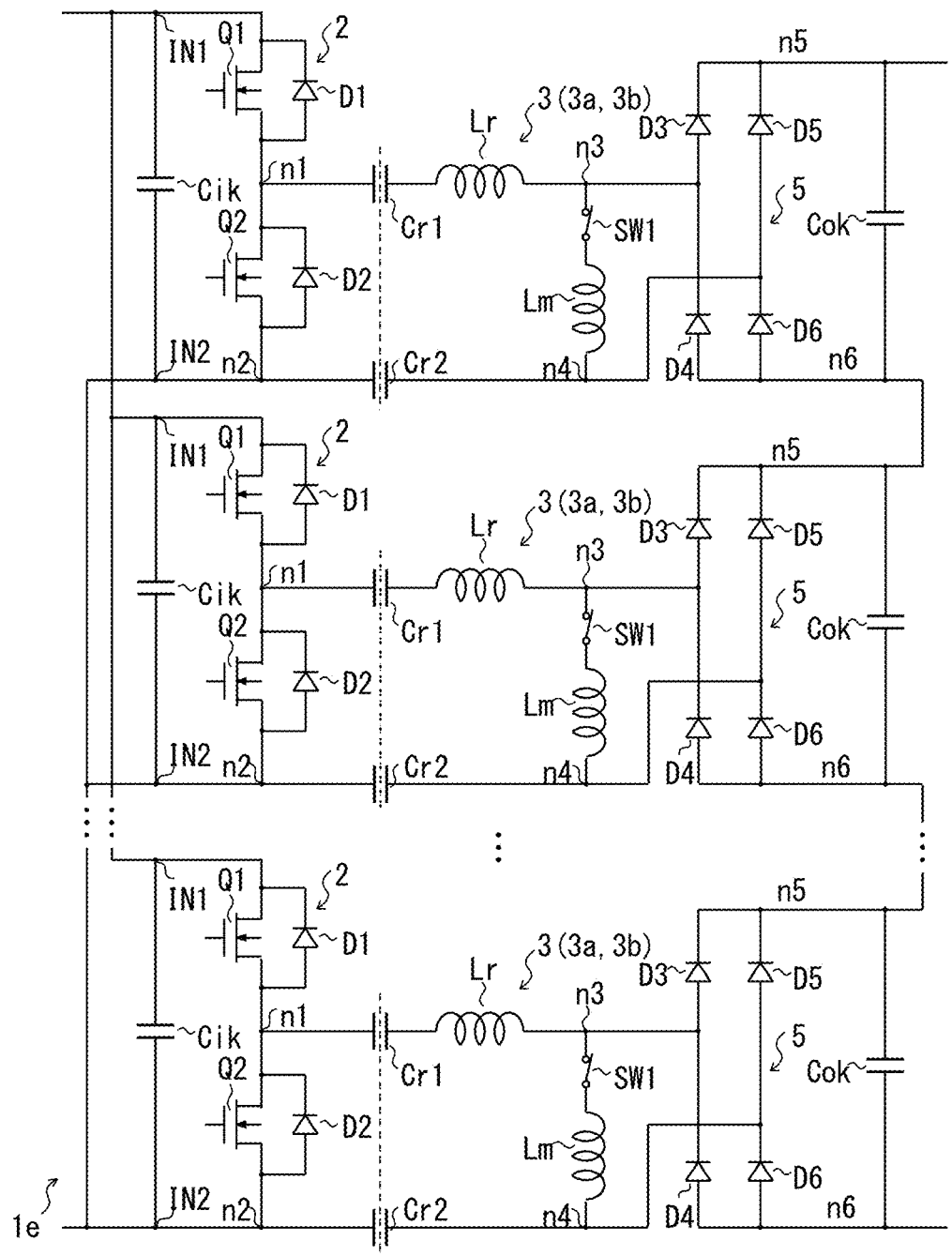
FIG. 13B is a block diagram illustrating an example of an output circuit having an IPOS configuration.

FIG. 13B is a block diagram illustrating an example of a power conversion circuit 1e having an IPOS configuration. The power conversion circuit 1e of FIG. 13B has the plurality of power conversion circuits 1 of FIG. 1, and connects the input nodes IN1 and IN2 of the inverter circuit 2 in each power conversion circuit 1 in parallel. In FIG. 13B, the output nodes n5 and n6 of the output circuit 4 in each power conversion circuit 1 are connected in series. As a result, the power conversion circuit 1e in FIG. 13B can output a voltage having larger voltage amplitude than the input voltage. Therefore, by arbitrarily adjusting the number of connections of the power conversion circuit 1 in the power conversion circuit 1e, it is possible to realize a DC-DC converter capable of generating an output voltage having arbitrary voltage amplitude.

Since the power conversion circuit 1 or 1c in FIG. 1 or 11 does not include a transformer, when voltage amplitude of the input voltage Vik is so large as to exceed several kV, a large voltage is applied between both ends of the first capacitor Cr1 and the second capacitor Cr2. As a result, there is a possibility that the first capacitor Cr1 and the second capacitor Cr2 cause dielectric breakdown. When the voltage amplitude of the input voltage Vik is large, by connecting the plurality of power conversion circuits 1 or 1c in FIG. 1 or 11 in series, the input voltage Vik of each power conversion circuit 1 or is can be lowered.

Figure 14:
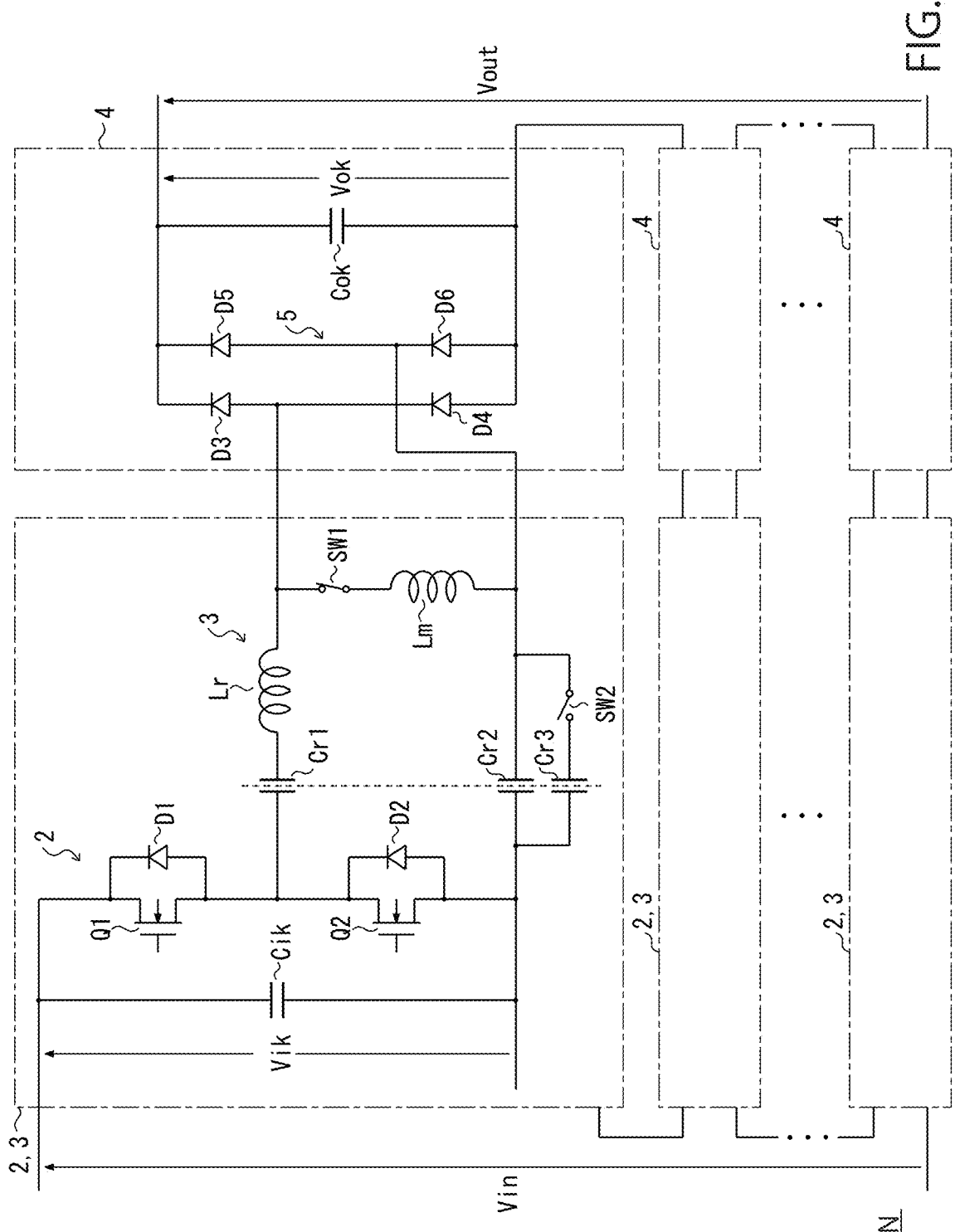
FIG. 14 is a circuit diagram of a power conversion device according to an embodiment.

FIG. 14 is a circuit diagram of a power conversion device 10 according to an embodiment. The power conversion device 10 of FIG. 14 can apply a high-voltage input voltage Vin between the first input node IN1 and the second input node IN2, The plurality of power conversion circuits 1 is connected in series between the first input node IN1 and the second input node IN2. Each of the power conversion circuits 1 has a circuit configuration of FIG. 1 or 11. A divided input voltage Vik obtained by dividing the input voltage yin by the number of the plurality of power conversion circuits 1 is applied to each of the power conversion circuits 1. For example, when the input voltage Vin is 1 kV, voltage amplitude of the divided input voltage Vik applied to each of the power conversion circuits 1 can be set to 100 V by connecting ten power conversion circuits 1 in series.

The power conversion device 10 of FIG. 14 includes the plurality of output circuits 4, and these output circuits 4 can be connected to have the ISOP configuration or the IPOS configuration as illustrated in FIG. 13A or 13B. In addition, each of the output circuits 4 can further have the ISOP configuration or the IPOS configuration, so that voltage amplitude of an output voltage output from the power conversion device 10 in FIG. 14 can be arbitrarily adjusted.

As described above, in the present embodiment, instead of the transformer, the first capacitor Cr1 and the second capacitor Cr2 constitute the resonant converter that achieves electrical insulation between the inverter circuit 2 and the output circuit 4. Therefore, a power loss when electric energy is converted into magnetic energy does not occur, and power conversion efficiency can be improved. In addition, since there is no circuit component that is difficult to design, such as a transformer, the power conversion circuit 1 can be easily designed.

In addition, by performing switching control of the first switch SW1, the power conversion circuit 1 according to the present embodiment can be operated as the electric field coupling type LLC resonant converter 1a having the first resonant circuit 3a including the second inductor Lm or the series resonant converter 1b having the second resonant circuit 3b not including the second inductor Lm. In the electric field coupling type LLC resonant converter 1a and the series resonant converter 1b, power conversion efficiency differs depending on output power (an output current). Therefore, by performing the switching control of the first switch SW1 depending on magnitude of the output power (output current), the power conversion efficiency can be improved in a wide range of the output power (output current).

Furthermore, by selectively selecting whether or not to add the third capacitor Cr3 to the second capacitor Cr2 so that soft switching can be normally performed, stable soft switching can be realized in both the case of operating as the electric field coupling type LLC resonant converter 1a and the case of operating as the series resonant converter 1b.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A power conversion circuit comprising:
an inverter circuit that comprises a first node and a second node that output a voltage according to an input voltage;
a resonant circuit connected to the first node and the second node and that comprises a third node and a fourth node that output a resonant voltage generated by resonant operation;
an output circuit connected to the third node and the fourth node and configured to output a DC voltage according to the input voltage, wherein
the resonant circuit comprises
a first inductor having one end connected to the third node,
a first capacitor connected between the first node and another end of the first inductor,
a second capacitor connected between the second node and the fourth node,
a second inductor connectable between the third node and the fourth node,
a first switch that switches whether or not to connect the second inductor between the third node and the fourth node,
a third capacitor connectable between the second node and the fourth node, and
a second switch that selectively selects whether or not the third capacitor is connected in parallel to the second capacitor and is connected between the second node and the fourth node; and a controller that performs switching control of the first switch and the second switch in conjunction with each other based on output power or an output current of the output circuit;
wherein, in the resonant circuit,
when the first switch is in a first switching state and the second switch is in a second switching state a first resonant circuit is formed, the first resonant circuit causes a resonant current to flow through the first capacitor, the first inductor, the second inductor, the second capacitor, and the output circuit, and
when the first switch is in the second switching state and the second switch is in the first switching state a second resonant circuit is formed, the second resonant circuit causes the resonant current to flow through the first capacitor, the first inductor, the output circuit, the second capacitor, and the third capacitor, and
wherein
the third capacitor has a capacitance value that causes a phase delay in a current with respect to a voltage of the second resonant circuit at a switching frequency of the inverter circuit.

2. The power conversion circuit according to claim 1, wherein
the resonant circuit switches the resonant operation by switching control of the first switch.

3. The power conversion circuit according to claim 1, wherein
the resonant voltage generated by the first resonant circuit or the second resonant circuit is supplied to the third node and the fourth node.

4. The power conversion circuit according to claim 1, wherein
the controller performs the switching control of the first switch such that the second resonant circuit is formed within a range in which the output power or the output current of the output circuit is greater than or equal to a first reference value and less than a second reference value that is larger than the first reference value, and performs the switching control of the first switch such that the first resonant circuit is formed within a range in which the output power or the output current of the output circuit is less than the first reference value or greater than or equal to the second reference value.

5. The power conversion circuit according to claim 1, wherein
by the controller,
when the second inductor is connected between the third node and the fourth node by the first switch, the third capacitor is not connected to the second switch, and only the second capacitor is connected between the second node and the fourth node, and
when the second inductor is not connected between the third node and the fourth node by the first switch, the third capacitor is connected to the second switch, and the second capacitor and the third capacitor are connected between the second node and the fourth node.

6. The power conversion circuit according to claim 1, further comprising
a plurality of power converters that comprises the inverter circuit, the resonant circuit, and the output circuit.

7. The power conversion circuit according to claim 6, wherein
output nodes of the plurality of output circuits in the plurality of power converters are connected in series.

8. The power conversion circuit according to claim 6, wherein output nodes of the plurality of output circuits in the plurality of power converters are connected in parallel.

9. The power conversion circuit according to claim 6, wherein
input nodes of the plurality of inverter circuits in the plurality of power converters are connected in series.

10. The power conversion circuit according to claim 6, wherein
input nodes of the plurality of inverter circuits in the plurality of power converters are connected in parallel.

11. The power conversion circuit according to claim 1, wherein
a DC voltage or a full-wave rectified voltage is input to an input node of the inverter circuit.

12. A power conversion device comprising:
a first input node and a second input node to which an input voltage is applied; and
a plurality of power conversion circuits connected in series between the first input node and the second input node and configured to perform power conversion in a state where a divided input voltage obtained by dividing the input voltage is electrically insulated, wherein
the power conversion circuit comprises
an inverter circuit that comprises a first node and a second node outputting a voltage according to the divided input voltage,
a resonant circuit connected to the first node and the second node and that comprises a third node and a fourth node that output a resonant voltage generated by resonant operation,
an output circuit connected to the third node and the fourth node and configured to output a DC voltage according to the input voltage,
the resonant circuit comprises
a first inductor having one end connected to the third node,
a first capacitor connected between the first node and another end of the first inductor,
a second capacitor connected between the second node and the fourth node,
a second inductor connectable between the third node and the fourth node,
a first switch that switches whether or not to connect the second inductor between the third node and the fourth node,
a third capacitor connectable between the second node and the fourth node, and
a second switch that selectively selects whether or not the third capacitor is connected in parallel to the second capacitor and is connected between the second node and the fourth node, and
a controller that performs switching control of the first switch and the second switch in conjunction with each other based on output power or an output current of the output circuit;
wherein, in the resonant circuit,
when the first switch is in a first switching state and the second switch is in a second switching state a first resonant circuit is formed, the first resonant circuit causes a resonant current to flow through the first capacitor, the first inductor, the second inductor, the second capacitor, and the output circuit, and
when the first switch is in the second switching state and the second switch is in the first switching state a second resonant circuit is formed, the second resonant circuit causes the resonant current to flow through the first capacitor, the first inductor, the output circuit, the second capacitor, and the third capacitor, and
wherein
the third capacitor has a capacitance value that causes a phase delay in a current with respect to a voltage of the second resonant circuit at a switching frequency of the inverter circuit.

* * * * *